United States Patent
Lee

(10) Patent No.: US 8,878,942 B1
(45) Date of Patent: Nov. 4, 2014

(54) CALIBRATION DEVICE APPLIED TO AN IMAGE CAPTURE SYSTEM AND RELATED CALIBRATION METHOD THEREOF

(71) Applicant: Etron Technology, Inc., Hsinchu (TW)

(72) Inventor: Chi-Feng Lee, Hsinchu County (TW)

(73) Assignee: Etron Technology, Inc., Hsinchu (TW)

( * ) Notice: Subject to any disclaimer, the term of this patent is extended or adjusted under 35 U.S.C. 154(b) by 0 days.

(21) Appl. No.: 14/144,572

(22) Filed: Dec. 31, 2013

(30) Foreign Application Priority Data

Jun. 27, 2013 (TW) .............................. 102122967 A

(51) Int. Cl.
*H04N 17/00* (2006.01)
*G06T 7/00* (2006.01)

(52) U.S. Cl.
CPC .................................. *G06T 7/0018* (2013.01)
USPC ......................................... 348/187; 348/188

(58) Field of Classification Search
CPC ..... H04N 17/00; H04N 17/002; H04N 17/02; H04N 17/04; H04N 17/045; G06T 7/0018
USPC ........ 348/180, 187, 181, 188; 702/85, 92, 94, 702/95
IPC .............................................. H04N 17/00,17/02
See application file for complete search history.

(56) References Cited

U.S. PATENT DOCUMENTS

| 4,670,782 A * | 6/1987 | Harshbarger et al. ......... 348/183 |
| 2013/0038529 A1* | 2/2013 | Hwang et al. ................. 345/157 |

* cited by examiner

*Primary Examiner* — Sherrie Hsia
(74) *Attorney, Agent, or Firm* — Winston Hsu; Scott Margo

(57) ABSTRACT

A calibration device applied to an image capture system includes a support unit and a plurality of display pattern generation units. The plurality of display pattern generation units are pivoted to the support unit. Each display pattern generation unit of the plurality of display pattern generation units includes a plurality of marks, the plurality of marks are used for generating a display pattern corresponding to the display pattern generation unit, the plurality of marks are not overlapped each other in the display pattern, and a plurality of display patterns of the plurality of display pattern generation units are also not overlapped each other. The plurality of display patterns are used for forming a calibration pattern applied to geometric calibration of the image capture system.

17 Claims, 7 Drawing Sheets

CALIBRATION DEVICE APPLIED TO AN IMAGE CAPTURE SYSTEM AND RELATED CALIBRATION METHOD THEREOF

BACKGROUND OF THE INVENTION

1. Field of the Invention

The present invention relates to a calibration device applied to an image capture system and a related calibration method thereof, and particularly to a calibration device and a related calibration method thereof that can generate calibration patterns having multi-angle information or depth information to increase accuracy of geometric calibration of an image capture system.

2. Description of the Prior Art

Generally speaking, an image capture system may have errors (e.g. geometric error) between image capture devices of the image capture system due to assembly tolerance or manufacturing process of the image capture system. The geometric error is usually generated by the assembly tolerance or lens characteristics of the image capture devices, where the geometric error includes lens deformation and shift, skew, or rotation between the image capture devices.

When the image capture system is not calibrated, the image capture system may have some problems due to the geometric error. For example, when the image capture system generates a three-dimensional image, the image capture system may make a three-dimensional image sensed by eyes of a user incorrect; when the image capture system is used for generating a depth map, the image capture system may generate incorrect depth information; and when the image capture system is applied to image stitch, an image generated by the image capture system may have discontinuous image stitch and discontinuous color. In addition, the image capture system can also need multi-angle calibration.

However, when the image capture system is calibrated, the prior art needs a plurality of calibration method to calibrate the above mentioned errors. Therefore, the prior art needs to spend much cost and time when the prior art executes calibration on the image capture system.

SUMMARY OF THE INVENTION

An embodiment provides a calibration device applied to an image capture system. The calibration device includes a support unit and a plurality of display pattern generation units. The plurality of display pattern generation units are pivoted to the support unit, where each display pattern generation unit of the plurality of display pattern generation units includes a plurality of marks, the plurality of marks are used for generating a display pattern corresponding to the display pattern generation unit, the plurality of marks are not overlapped each other in the display pattern, and a plurality of display patterns of the plurality of display pattern generation units are not overlapped each other. The plurality of display patterns are used for forming a calibration pattern applied to geometric calibration of the image capture system.

Another embodiment provides a calibration method applied to an image capture system, where a calibration device applied to the image capture system includes a support unit, a plurality of display pattern generation units, and a controller. The calibration method includes the controller controlling each display pattern generation unit of the plurality of display pattern generation units to generate a display pattern, where a plurality of display patterns of the plurality of display pattern generation units are used for forming a calibration pattern; the image capture system capturing an image corresponding to the calibration pattern; an operation device of the image capture system generating a plurality of geometric calibration parameters according to the image; and the operation device executing geometric rectification on the image capture system according to the plurality of geometric calibration parameters.

The present invention provides a calibration device applied to an image capture system and a related calibration method thereof. The calibration device and the calibration method utilize a controller to control each display pattern generation unit of a plurality of display pattern generation units to rotate to a corresponding rotation angle, or control turning-on or turning-off of a plurality of marks of each display pattern generation unit of the plurality of display pattern generation units to generate a corresponding display pattern. Therefore, the calibration device can generate a calibration pattern having multi-angle information or a plurality of depth information through the plurality of display pattern generation units. Thus, an operation device of the image capture system can increase accuracy of geometric calibration of the image capture system according to the multi-angle information or the plurality of depth information of the calibration pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
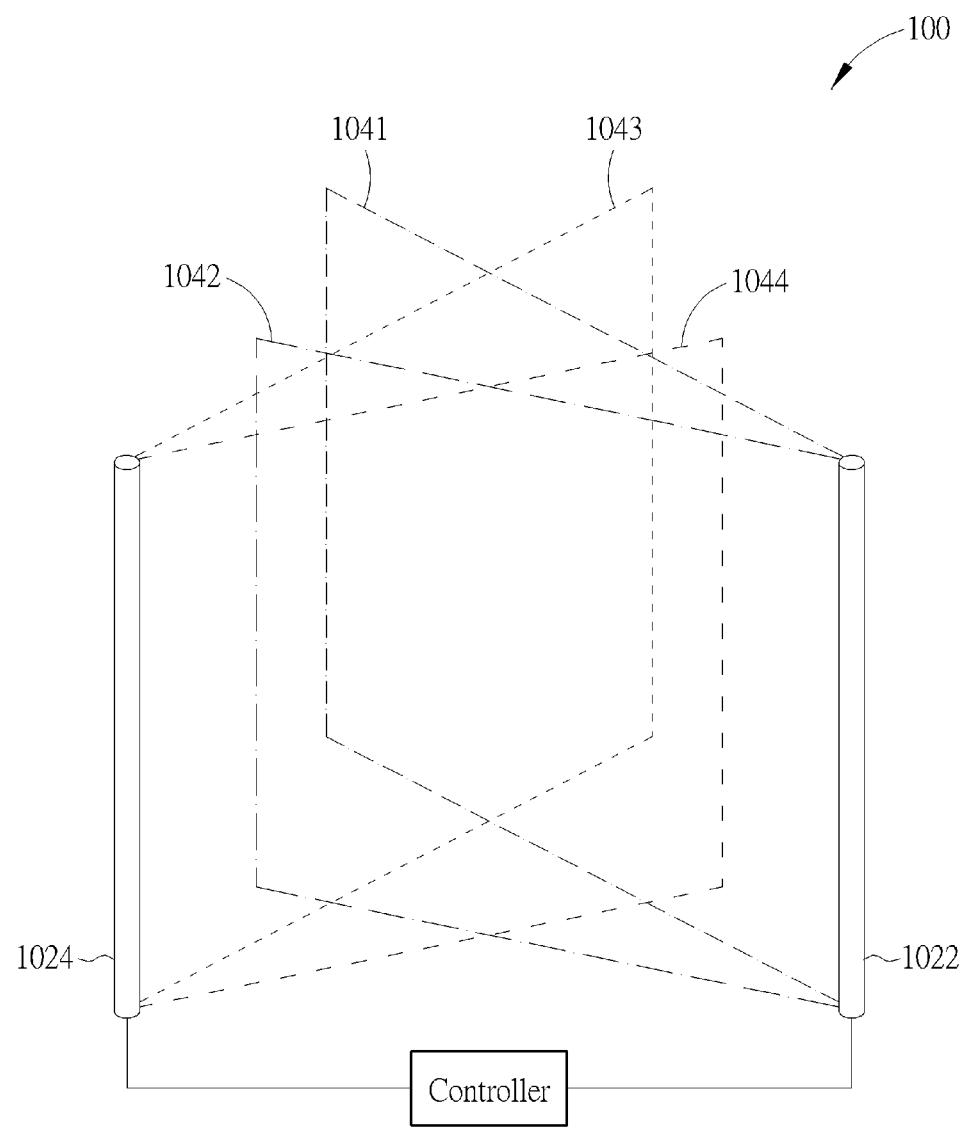
FIG. 1 is a diagram illustrating a calibration device applied to an image capture system according to an embodiment.

Please refer to FIG. 1. FIG. 1 is a diagram illustrating a calibration device 100 applied to an image capture system according to an embodiment, where the calibration device 100 includes a support unit, four display pattern generation units 1041-1044, and a controller (not shown in FIG. 1), where the support unit includes a first supporter 1022 and a second supporter 1024, and the controller is coupled to the four display pattern generation units 1041-1044. But, the present invention is not limited to the calibration device 100 including the four display pattern generation units 1041-1044. That is to say, the calibration device 100 can include a plurality of display pattern generation units. As shown in FIG. 1, a pivot hole of one side of each display pattern generation unit of the display pattern generation units 1041, 1042 is pivoted to the first supporter 1022, and a pivot hole of one side of each display pattern generation unit of the display pattern generation units 1043, 1044 is pivoted to the second supporter 1024. But, the present invention is not limited to the above mentioned pivoted relationship between the four display pattern generation units 1041-1044, the first supporter 1022, and the second supporter 1024.

Figure 2:
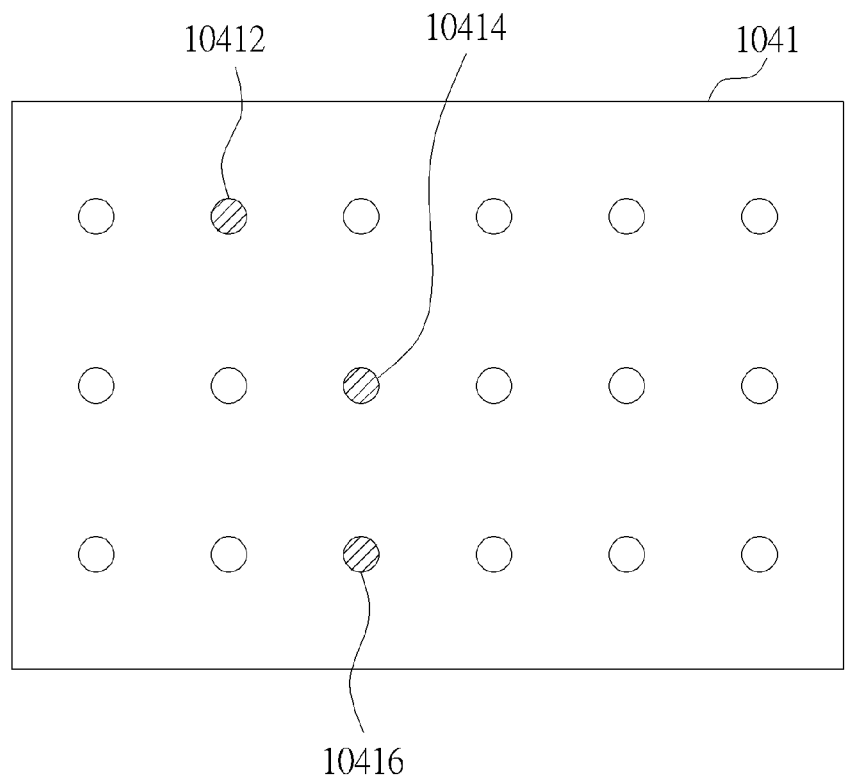
FIG. 2 is a diagram illustrating the display pattern generation unit including a plurality of marks.

Please refer to FIG. 2. FIG. 2 is a diagram illustrating the display pattern generation unit 1041 including a plurality of marks. As shown in FIG. 2, the display pattern generation unit 1041 includes 18 marks, where the 18 marks included in the display pattern generation unit 1041 are objects having color or luminaries, and the 18 marks included in the display pattern generation unit 1041 are installed on the display pattern generation unit 1041. But, the present invention is not limited to the display pattern generation unit 1041 including 18 marks. That is to say, the display pattern generation unit 1041 can include a plurality of marks. In addition, a number of a plurality of marks included in each display pattern generation unit of the four display pattern generation units 1041-1044 can be the same or different. The 18 marks included in the display pattern generation unit 1041 are used for generating a display pattern (e.g. an arrangement method of the 18 marks included in the display pattern generation unit 1041) corresponding to the display pattern generation unit 1041, and the 18 marks are not overlapped each other in the display pattern. In addition, when the 18 marks included in the display pattern generation unit 1041 are luminaries, the controller can control turning-on or turning-off of the 18 marks included in the display pattern generation unit 1041 to make the display pattern generation unit 1041 utilize turning-on or turning-off of the 18 marks to generate a corresponding display pattern. As shown in FIG. 2, color of marks 10412, 10414, 10416 of the 18 marks included in the display pattern generation unit 1041 acting as locating points is different from color of other marks of the 18 marks acting as reference points. But, in another embodiment of the present invention, the color of the marks 10412, 10414, 10416 of the 18 marks included in the display pattern generation unit 1041 acting as locating points is the same as the color of the other marks of the 18 marks acting as reference points. But, the present invention is not limited to a number (three) of marks of the 18 marks included in the display pattern generation unit 1041 acting as locating points. In addition, four display patterns generated by the four display pattern generation units 1041-1044 are not overlapped each other, where the four display patterns are used for forming a calibration pattern. In addition, subsequent operational principles of each display pattern generation unit of the display pattern generation unit 1042-1044 are the same as those of the display pattern generation unit 1041, so further description thereof is omitted for simplicity.

Therefore, the image capture system (not shown in FIG. 1) can capture an image corresponding to the calibration pattern generated by the calibration device 100, an operation device (not shown in FIG. 1) of the image capture system can generate a plurality of geometric calibration parameters according to the image captured by the image capture system and a geometric calibration technology provided by the prior art, and execute geometric rectification on the image capture system according to the plurality of geometric calibration parameters, where the image capture system includes at least one image capture device.

Figure 3:
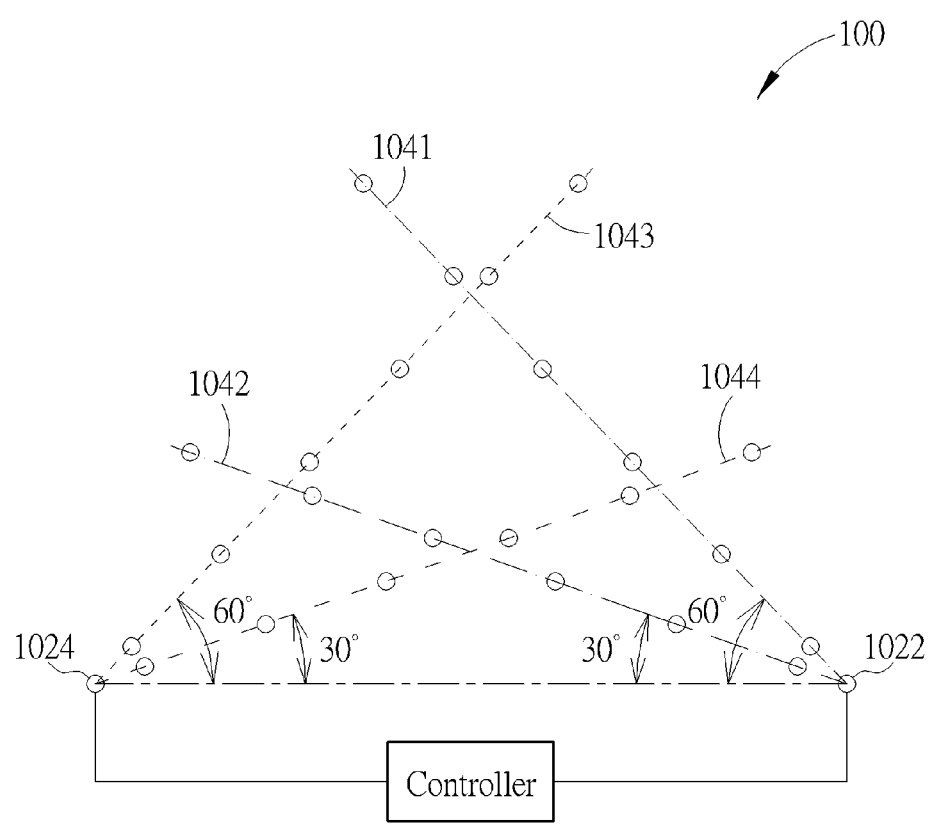
FIG. 3 is a bird's-eye diagram illustrating the calibration device.

Please refer to FIG. 3. FIG. 3 is a bird's-eye diagram illustrating the calibration device 100. As shown in FIG. 3, each display pattern generation unit of the display pattern generation units 1041-1044 has a corresponding rotation angle. As shown in FIG. 3, the display pattern generation unit 1041 has a rotation angle 60°, the display pattern generation unit 1042 has a rotation angle 30°, the display pattern generation unit 1043 has a rotation angle 60°, and the display pattern generation unit 1044 has a rotation angle 30°. But, the present invention is not limited to the above mentioned rotation angles of the display pattern generation units 1041-1044. In addition, because the controller can control a rotation angle of each display pattern generation unit of the display pattern generation units 1041-1044, the calibration device 100 can generate the calibration pattern having multi-angle information through the four display pattern generation units 1041-1044. Thus, the operation device can increase accuracy of the geometric calibration of the image capture system according to the multi-angle information of the calibration pattern. In addition, in another embodiment of the present invention, each mark of the plurality of marks of the calibration device 100 has a corresponding supporter to replace the display pattern generation units 1041-1044.

Figure 4:
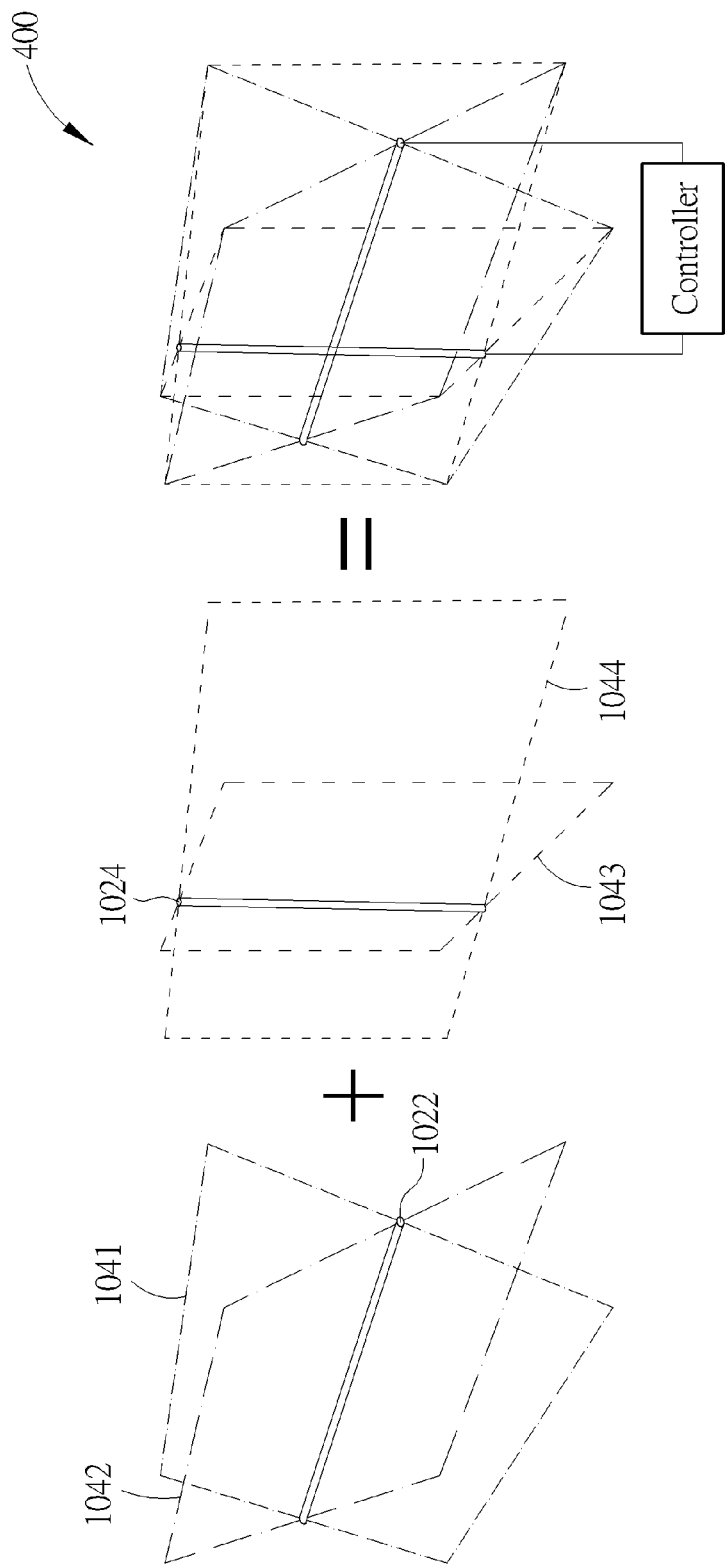
FIG. 4 is a diagram illustrating a calibration device applied to an image capture system according to another embodiment.

Please refer to FIG. 4. FIG. 4 is a diagram illustrating a calibration device 400 applied to an image capture system according to another embodiment. As shown in FIG. 4, a difference between the calibration device 400 and the calibration device 100 is that a central pivot hole of one side of each display pattern generation unit of display pattern generation units 1041, 1042 is pivoted to a first supporter 1022, and a central pivot hole of one side of each display pattern generation unit of display pattern generation units 1043, 1044 is pivoted to a second supporter 1024. But, the present invention is not limited to the above mentioned pivoted relationship between the four display pattern generation units 1041-1044 and the first supporter 1022 and the second supporter 1024. In addition, subsequent operational principles of the calibration device 400 are the same as those of the calibration device 100, so further description thereof is omitted for simplicity.

Figure 5:
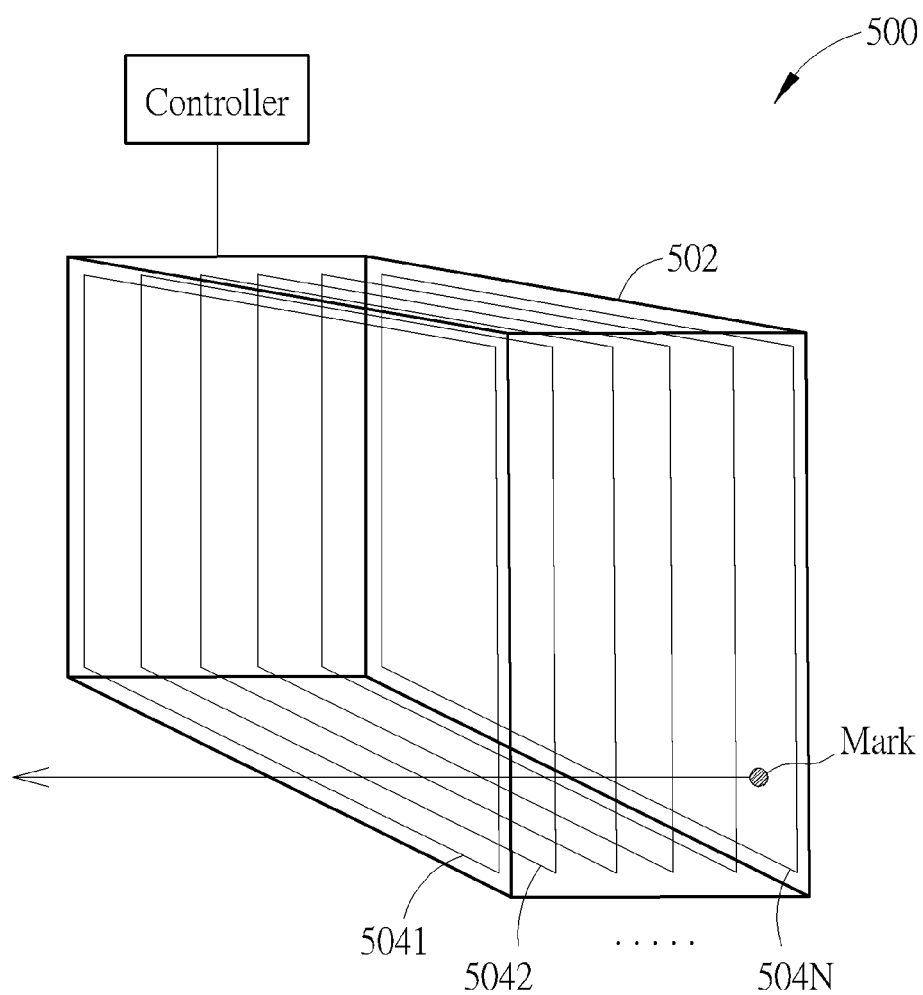
FIG. 5 is a diagram illustrating a calibration device 400 applied to an image capture system according to another embodiment.

Please refer to FIG. 5. FIG. 5 is a diagram illustrating a calibration device 500 applied to an image capture system according to another embodiment, where the calibration device 500 includes a support unit 502, a plurality of display pattern generation units 5041-504N, and a controller (not shown in FIG. 5), where the plurality of display pattern generation units 5041-504N are installed in the support unit 502, and N is a positive integer. As shown in FIG. 5, a difference between the calibration device 500 and the calibration device 100 is that each display pattern generation unit of the plurality of display pattern generation units 5041-504N can be a transparent display panel, and the plurality of display pattern generation units 5041-504N are parallel each other and perpendicular to a display side of the display pattern generation unit 5041, where a transparent display panel is transparent when the transparent display panel does not generate any image. But, the present invention is not limited to each display pattern generation unit of the display pattern generation units 5041-504N being a transparent display panel.

When the display pattern generation unit 5041 is a transparent display panel, the controller can control turning-on or turning-off of a plurality of marks (where each mark includes at least one pixel) included in the display pattern generation unit 5041 to generate a display pattern (similar to FIG. 2) corresponding to the display pattern generation unit 5041, where a plurality of marks are not overlapped each other in the display pattern of the display pattern generation unit 5041. In addition, operational principles of each display pattern generation unit of the plurality of display pattern generation units 5042-504N are the same as those of the display pattern generation unit 5041, so further description thereof is omitted for simplicity. In addition, N display patterns generated by the plurality of display pattern generation units 5041-504N are not overlapped each other, where the N display patterns are used for forming a calibration pattern. Because the plurality of display pattern generation units 5041-504N are parallel each other and perpendicular to the display side of the display pattern generation unit 5041, the calibration pattern formed by the N display patterns has depth information (that is, the calibration pattern is a three-dimensional calibration pattern), where the depth information corresponds to a number and staking density of the plurality of display pattern generation units 5041-504N. Thus, the operation device can increase accuracy of geometric calibration of the image capture system according to the depth information of the calibration pattern. In addition, subsequent operational principles of each display pattern generation unit of the calibration device 500 are the same as those of the calibration device 100, so further description thereof is omitted for simplicity.

Figure 6:
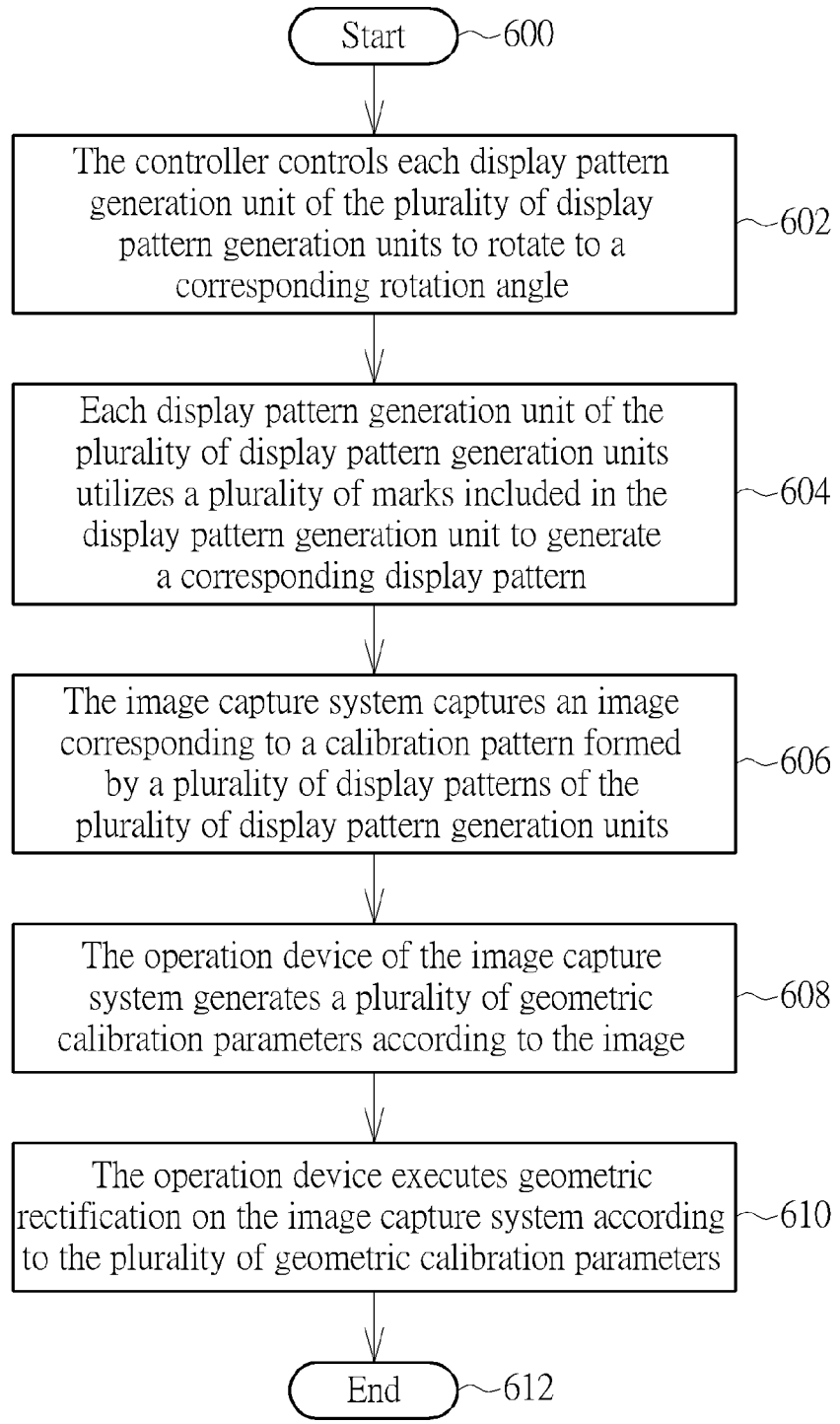
FIG. 6 is a calibration method applied to an image capture system according to another embodiment.

Please refer to FIG. 1, FIG. 2, FIG. 3, and FIG. 6. FIG. 6 is a calibration method applied to an image capture system according to another embodiment. The method in FIG. 6 is illustrated using the calibration device 100 in FIG. 1. Detailed steps are as follows:

Step 600: Start.

Step 602: The controller controls each display pattern generation unit of the plurality of display pattern generation units to rotate to a corresponding rotation angle.

Step 604: Each display pattern generation unit of the plurality of display pattern generation units utilizes a plurality of marks included in the display pattern generation unit to generate a corresponding display pattern.

Step 606: The image capture system captures an image corresponding to a calibration pattern formed by a plurality of display patterns of the plurality of display pattern generation units.

Step 608: The operation device of the image capture system generates a plurality of geometric calibration parameters according to the image.

Step 610: The operation device executes geometric rectification on the image capture system according to the plurality of geometric calibration parameters.

Step 612: End.

In Step 602, the controller controls each display pattern generation unit of the four display pattern generation units 1041-1044 to rotate to a corresponding rotation angle. Therefore, as shown in FIG. 3, the display pattern generation unit 1041 has a rotation angle 60°, the display pattern generation unit 1042 has a rotation angle 30°, the display pattern generation unit 1043 has a rotation angle 60°, and the display pattern generation unit 1044 has a rotation angle 30°. But, the present invention is not limited to the above mentioned rotation angles of the display pattern generation units 1041-1044. In Step 604, as shown in FIG. 2, the display pattern generation unit 1041 includes 18 marks, and the 18 marks included in the display pattern generation unit 1041 are installed on the display pattern generation unit 1041. But, the present invention is not limited to display pattern generation unit 1041 including 18 marks. That is to say, the display pattern generation unit 1041 can include a plurality of marks, a number of a plurality of marks included in each display pattern generation unit of the four display pattern generation units 1041-1044 can be the same or different. The 18 marks included in the display pattern generation unit 1041 are used for generating a display pattern (e.g. an arrangement method of the 18 marks included in the display pattern generation unit 1041) corresponding to the display pattern generation unit 1041, and the 18 marks are not overlapped each other in the display pattern. In addition, when the 18 marks included in the display pattern generation unit 1041 are luminaries, the controller can control turning-on or turning-off of the 18 marks included in the display pattern generation unit 1041 to make the display pattern generation unit 1041 utilize turning-on or turning-off of the 18 marks to generate a corresponding display pattern.

In addition, as shown in FIG. 2, color of the marks 10412, 10414, 10416 of the 18 marks included in the display pattern generation unit 1041 acting as locating points is different from color of the other marks of the 18 marks acting as reference points. But, in another embodiment of the present invention, the color of the marks 10412, 10414, 10416 of the 18 marks included in the display pattern generation unit 1041 acting as locating points is the same as the color of the other marks of the 18 marks acting as reference points. But, the present invention is not limited to a number (three) of marks of the 18 marks included in the display pattern generation unit 1041 acting as locating points. In addition, four display patterns generated by the four display pattern generation units 1041-1044 are not overlapped each other, where the four display patterns are used for forming a calibration pattern.

Therefore, in Step 606, the image capture system (not shown in FIG. 1) can capture the image corresponding to the calibration pattern generated by the calibration device 100. In Step 608, the operation device (not shown in FIG. 1) can generate the plurality of geometric calibration parameters according to the image captured by the image capture system and the geometric calibration technology provided by the prior art. In Step 610, the operation device can execute the geometric rectification on the image capture system according to the plurality of geometric calibration parameters, where the image capture system includes at least one image capture device.

Because the controller can control a rotation angle of each display pattern generation unit of the display pattern generation units 1041-1044, the calibration device 100 can generate the calibration pattern having multi-angle information through the four display pattern generation units 1041-1044. Thus, the operation device can increase accuracy of the geometric calibration of the image capture system according to the multi-angle information of the calibration pattern.

Figure 7:
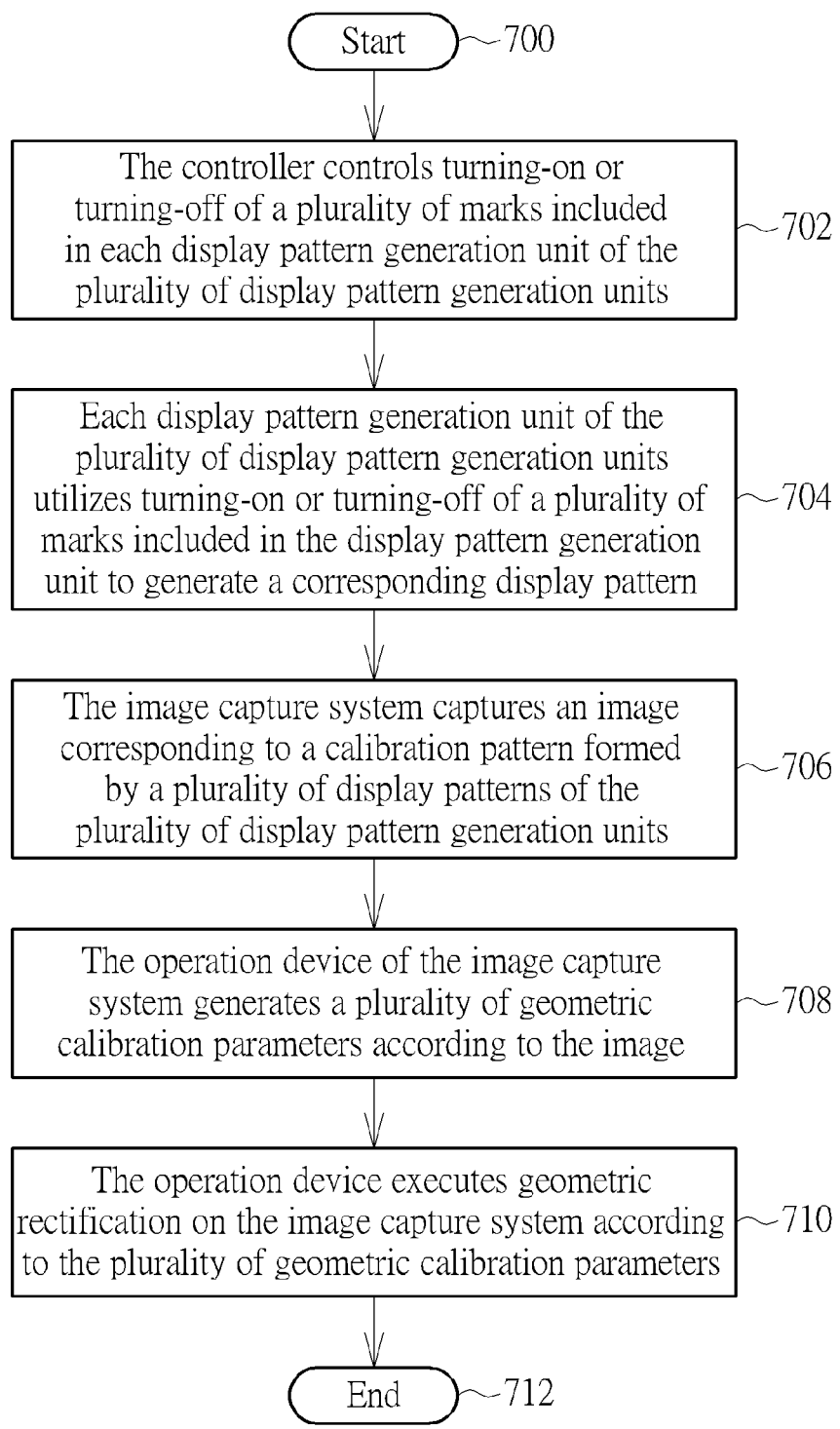
FIG. 7 is a calibration method applied to an image capture system according to another embodiment.

Please refer to FIG. 5 and FIG. 7. FIG. 7 is a calibration method applied to an image capture system according to another embodiment. The method in FIG. 7 is illustrated using the calibration device 500 in FIG. 5. Detailed steps are as follows:

Step 700: Start.

Step 702: The controller controls turning-on or turning-off of a plurality of marks included in each display pattern generation unit of the plurality of display pattern generation units.

Step 704: Each display pattern generation unit of the plurality of display pattern generation units utilizes turning-on or turning-off of a plurality of marks included in the display pattern generation unit to generate a corresponding display pattern.

Step 706: The image capture system captures an image corresponding to a calibration pattern formed by a plurality of display patterns of the plurality of display pattern generation units.

Step 708: The operation device of the image capture system generates a plurality of geometric calibration parameters according to the image.

Step 710: The operation device executes geometric rectification on the image capture system according to the plurality of geometric calibration parameters.

Step 712: End.

A difference between the embodiment in FIG. 7 and the embodiment in FIG. 6 is that in Step 702, because each display pattern generation unit of the plurality of display pattern generation units 5041-504N of the calibration device 500 can be a transparent display panel, the controller can control turning-on or turning-off of the plurality of marks (where each mark includes at least one pixel) included in the display pattern generation unit 5041; and in Step 704, the display pattern generation unit 5041 utilizes turning-on or turning-off of marks thereof to generate a display pattern (similar to FIG. 2) corresponding to the display pattern generation unit 5041, where the plurality of marks are not overlapped each other in the display pattern of the display pattern generation unit 5041. In addition, the N display patterns generated by the plurality of display pattern generation units 5041-504N are not overlapped each other, where the N display patterns are used for forming the calibration pattern. Because the plurality of display pattern generation units 5041-504N are parallel each other and perpendicular to the display side of the display pattern generation unit 5041, the calibration pattern formed by the N display patterns has depth information (that is, the calibration pattern is a three-dimensional calibration pattern), where the depth information corresponds to a number and staking density of the plurality of display pattern generation units 5041-504N. Thus, in Step 708 and Step 710, the operation device can increase accuracy of the geometric calibration of the image capture system according to the depth information of the calibration pattern. In addition, subsequent operational principles of the embodiment in FIG. 7 are the same as those of the embodiment in FIG. 6, so further description thereof is omitted for simplicity.

To sum up, the calibration device applied to the image capture system and the related calibration method thereof utilize the controller to control each display pattern generation unit of the plurality of display pattern generation units to rotate to a corresponding rotation angle, or control turning-on or turning-off of a plurality of marks of each display pattern generation unit of the plurality of display pattern generation units to generate a corresponding display pattern. Therefore, the calibration device can generate a calibration pattern having multi-angle information or a plurality of depth information through the plurality of display pattern generation units. Thus, the operation device of the image capture system can increase accuracy of geometric calibration of the image capture system according to the multi-angle information or the plurality of depth information of the calibration pattern.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration device applied to an image capture system, the calibration device comprising:
    a support unit; and
    a plurality of display pattern generation units pivoted to the support unit, wherein each display pattern generation unit of the plurality of display pattern generation units comprises a plurality of marks, the plurality of marks are used for generating a display pattern corresponding to the display pattern generation unit, the plurality of marks are not overlapped each other in the display pattern, and a plurality of display patterns of the plurality of display pattern generation units are not overlapped each other;
    wherein the plurality of display patterns are used for forming a calibration pattern applied to geometric calibration of the image capture system.

2. The calibration device of the claim 1, wherein the support unit comprises:
    a first supporter; and
    a second supporter, wherein the first supporter is parallel to the second supporter;
    wherein a pivot hole of one side of each display pattern generation unit of partial display pattern generation units of the plurality of display pattern generation units is pivoted to the first supporter, a pivot hole of one side of each display pattern generation unit of other display pattern generation units of the plurality of display pattern generation units is pivoted to the second supporter, and each display pattern generation unit of the plurality of display pattern generation units has a corresponding rotation angle or a corresponding distance.

3. The calibration device of the claim 2, further comprising:
    a controller for controlling the corresponding rotation angle or the corresponding distance.

4. The calibration device of the claim 1, wherein the support unit comprises:
    a first supporter; and
    a second supporter, wherein the first supporter is perpendicular to the second supporter;
    wherein a central pivot hole of one side of each display pattern generation unit of partial display pattern generation units of the plurality of display pattern generation units is pivoted to the first supporter, a central pivot hole of one side of each display pattern generation unit of other display pattern generation units of the plurality of display pattern generation units is pivoted to the second supporter, and each display pattern generation unit of the plurality of display pattern generation units has a corresponding rotation angle.

5. The calibration device of the claim 4, further comprising:
    a controller for controlling the corresponding rotation angle.

6. The calibration device of the claim 1, wherein the display pattern generation unit is a transparent display panel and installed in the support unit, and a stacking method of the plurality of display pattern generation units is that the plurality of display pattern generation units are parallel each other and perpendicular to a display side of the display pattern generation unit, wherein the calibration pattern is a three-dimensional calibration pattern.

7. The calibration device of the claim 6, further comprising:
    a controller coupled to the plurality of display pattern generation units for controlling the plurality of marks to generate the display pattern corresponding to the display pattern generation unit, wherein each mark of the plurality of marks comprises at least one pixel.

8. The calibration device of the claim 1, wherein a color of marks of the plurality of marks acting as locating points is the same or different from a color of marks of the plurality of marks acting as reference points.

9. The calibration device of the claim 1, wherein the plurality of marks are luminaries.

10. A method for generating a calibration pattern applied to an image capture system, wherein a calibration device applied to the image capture system comprises a support unit, a plurality of display pattern generation units, and a controller, the method comprising:
    controlling each display pattern generation unit of the plurality of display pattern generation units to generate a display pattern by the controller;
    controlling the each display pattern generation unit to rotate to a corresponding rotation angle by the controller; and controlling the plurality of display pattern generation units to utilize a plurality of display patterns of the plurality of display pattern generation units to form a calibration pattern by the controller.

11. The calibration method of claim 10, wherein controlling the each display pattern generation unit to generate the display pattern by the controller comprises:

controlling the each display pattern generation unit to utilize a plurality of marks to generate the display pattern, wherein the each display pattern generation unit comprises the plurality of marks by the controller.

12. The method of claim 11, wherein a color of marks of the plurality of marks acting as locating points is the same or different from a color of marks of the plurality of marks acting as reference points.

13. The method of claim 11, wherein the plurality of marks are luminaries.

14. The method of claim 13, further comprising:

controlling turning-on or turning-off of the plurality of marks by the controller; and controlling the each display pattern generation unit to utilize turning-on or turning-off of the plurality of marks to generate the display pattern by the controller.

15. The method of claim 14, wherein a color of marks of the plurality of marks acting as locating points is the same or different from a color of marks of the plurality of marks acting as reference points.

16. The method of claim 10, wherein when the each display pattern generation unit is a transparent display panel, controlling the each display pattern generation unit to generate the display pattern by the controller comprises:

controlling turning-on or turning-off of a plurality of marks comprised in the each display pattern generation unit by the controller; and controlling the each display pattern generation unit to utilize turning-on or turning-off of the plurality of marks to generate the display pattern by the controller.

17. The method of claim 16, wherein a color of marks of the plurality of marks acting as locating points is the same or different from a color of marks of the plurality of marks acting as reference points.

* * * * *